June 22, 1926.

McGARVEY CLINE 1,589,838

APPARATUS FOR EXTRACTING VOLATILE OILS FROM SOLID SUBSTANCES

Filed August 24, 1923    4 Sheets-Sheet 1

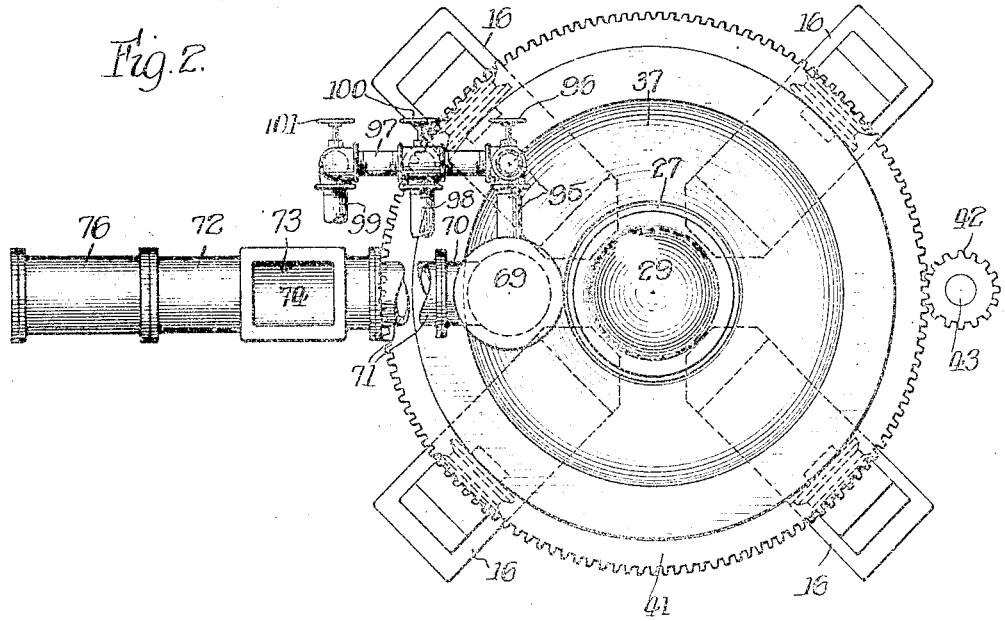
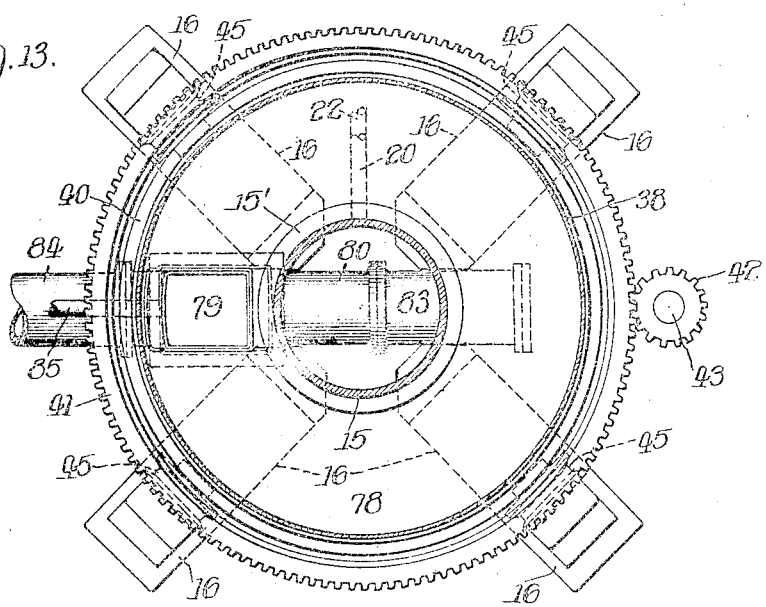

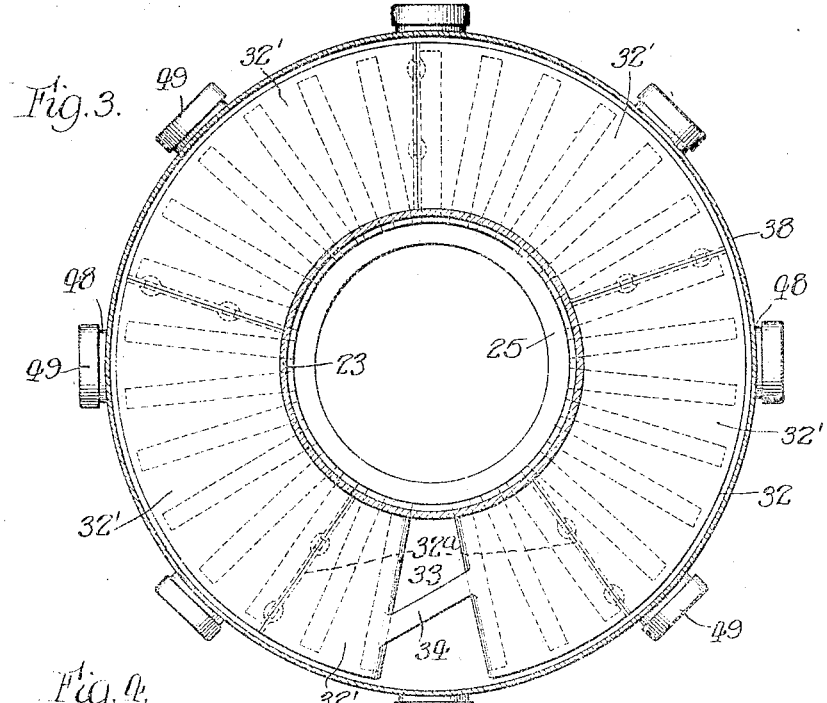
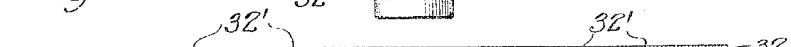
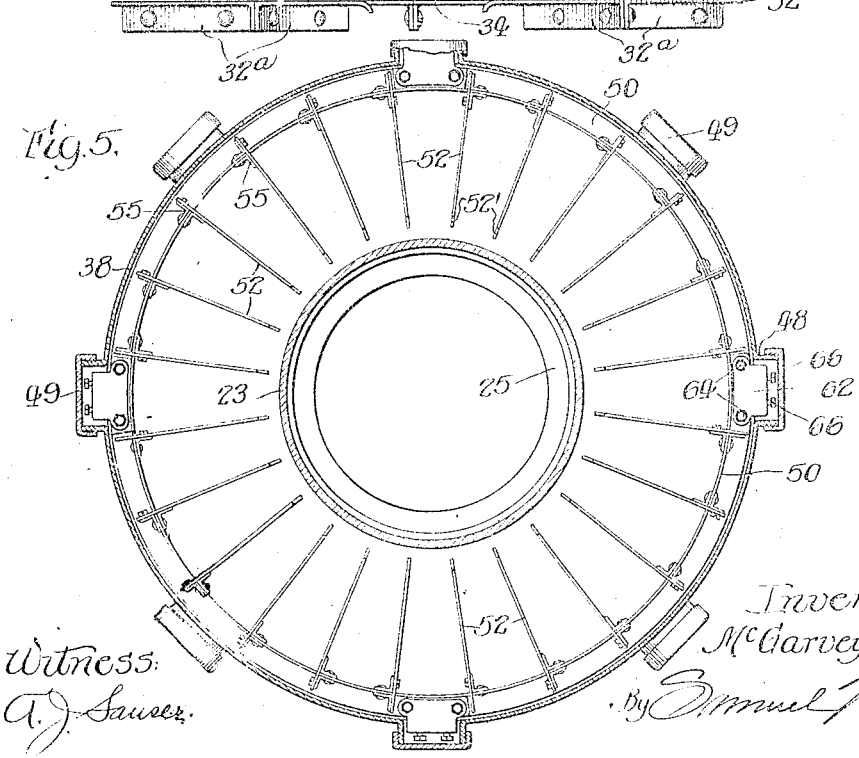

June 22, 1926.
McGARVEY CLINE
1,589,838
APPARATUS FOR EXTRACTING VOLATILE OILS FROM SOLID SUBSTANCES
Filed August 24, 1923    4 Sheets-Sheet 4
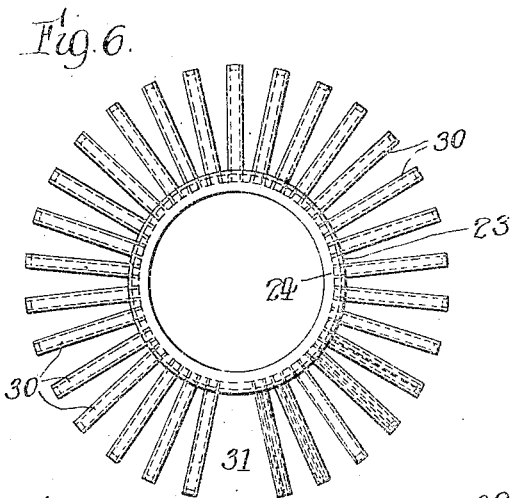
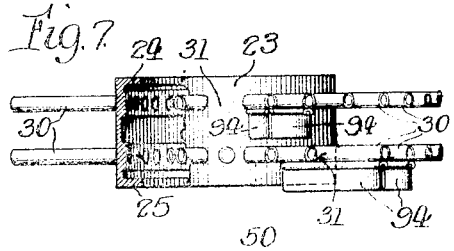
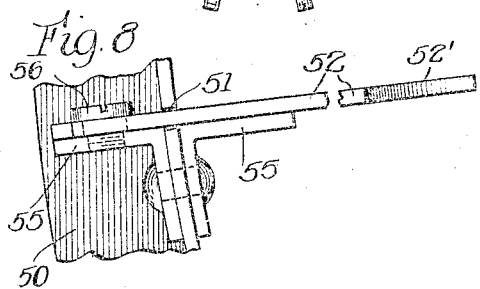
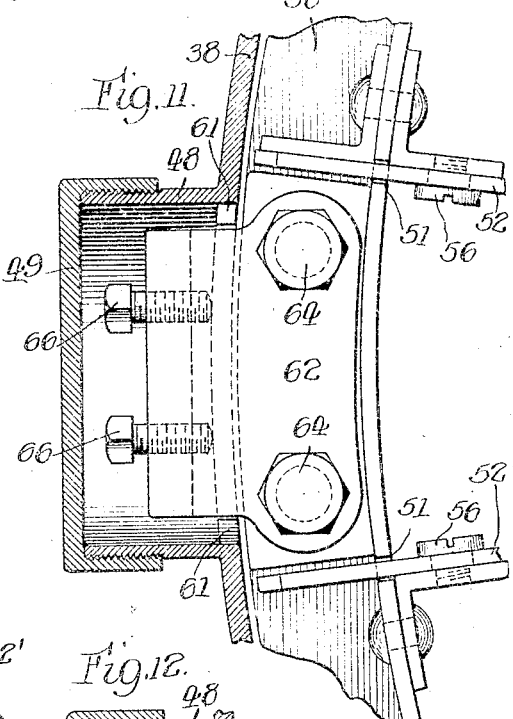
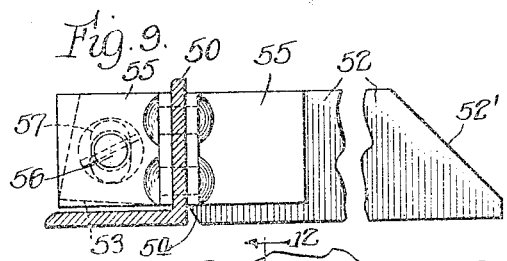
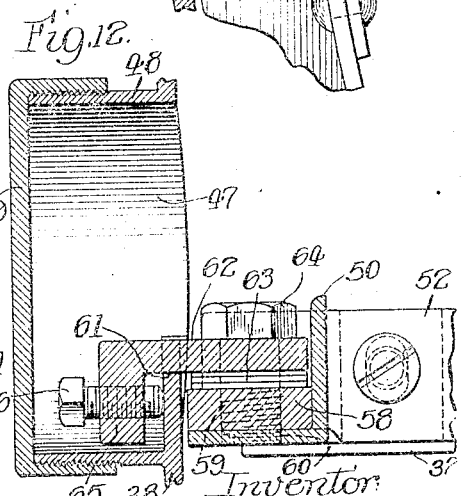
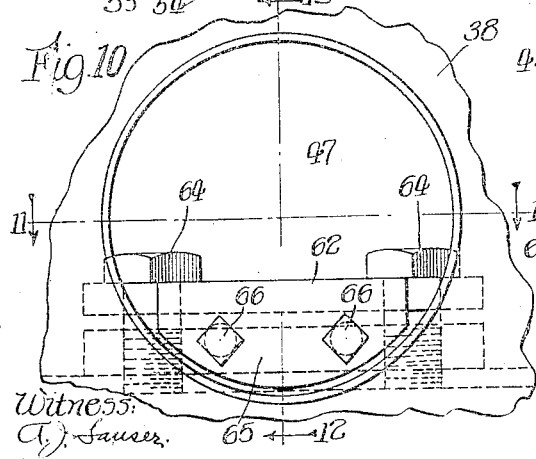

Patented June 22, 1926.

1,589,838

UNITED STATES PATENT OFFICE.

McGARVEY CLINE, OF JACKSONVILLE, FLORIDA.

APPARATUS FOR EXTRACTING VOLATILE OILS FROM SOLID SUBSTANCES.

Application filed August 24, 1923. Serial No. 659,041.

This invention relates to an apparatus for extracting volatile oils from solid substances by steam distillation, and has been designed more particularly to effect the extraction of turpentine from comminuted wood in the form of sawdust, pulp and chips; such comminuted wood representing the waste product of lumber mills, which is ordinarily utilized as fuel to furnish the power required by the mill.

Heretofore, where the extraction of valuable material from the waste before burning the latter has been practiced, it has been customary to load the waste into retorts wherein the oil is extracted by the direct action of steam thereon, and then transfer the waste from the retort to the power plant of the mill frequently located at some distance from the latter. This method of handling is intermittent, the retort being filled, sealed, operated, opened, and emptied; involving considerable expense for labor; and one of the objects of the present invention is to provide a retort for the extraction of the oil which may conveniently constitute a section or link of a continuously operating conveyor from the mill to the power plant or other point where the waste is burned or otherwise disposed of. Another object of the invention is to provide an apparatus for the extraction of volatile oil from the waste wood wherein the heating agent (preferably steam) may be most efficiently and economically used for the heating of the material to the required extent to volatilize the oil. Another object, ancillary to the above, is to provide a means of heating by which the heat shall be most intimately, thoroughly and uniformly applied to the entire mass of the material. Another object, is to provide a means of heating the material undergoing treatment which will deliver the heat units necessary to vaporize the oil in the chips without having steam condense on, and thus increase the moisture content of, the latter, which decreases its value as fuel. Another object is to provide an improved apparatus wherein the heat is mainly supplied by high pressure steam out of direct contact with the material treated, and wherein the latter is also subjected to the direct action of low pressure, oil free steam in such a quantity and so circulated therethrough that no portion of said steam can ever become saturated with oil vapor, which would retard or arrest the further vaporization of the latter; thereby increasing the rate of evaporation of the oil. A further important object of the invention is to provide an apparatus of the character specified of such a construction that the same may, with a minimum of trouble, be disassembled to the necessary extent for inspection, cleaning and repairs when required. A further object is to provide an apparatus including a plurality of superposed chambers through which the material passes successively from top to bottom and in each of which it is agitated and caused to travel over the surface of a hot plate and wherein the low pressure steam in direct contact with the material is caused to travel countercurrent to the flow of the material through and around the axis of each of the successive chambers, whereby the material is thoroughly and evenly subjected to the action of the steam.

Other objects and attendant advantages of the invention will be apparent to persons skilled in the art from the following detail description taken in connection with the accompanying drawings in which I have illustrated one practical and workable embodiment of the principle of the invention and wherein—

Fig. 2 is a top plan view of same, partly broken out;

Fig. 3 is a top plan view of one of the annular heating plates, with the drum and shell in horizontal section;

Fig. 4 is an edge elevation of the heating plate shown in Fig. 3;

Fig. 5 is a top plan view of one of the scrapers which revolves over the surface of a heating plate, with the drum and shell in horizontal section;

Fig. 6 is a top plan view on a reduced scale of a heater for the hot plate shown in Figs. 3 and 4 that directly underlies and carries the latter;

Fig. 7 is a side elevation, partly in section of the heater shown in Fig. 6;

Figs. 8 and 9 are detail views in top plan and side elevation, respectively, of one of the scraper arms and the manner and means of mounting the same on the angle iron ring of the scraper;

Fig. 10 is an enlarged elevation showing one of a series of radial openings or hand holes in the cylindrical shell through which access is had to the scrapers and their supporting and adjusting devices, with the cover of the opening removed;

Fig. 11 is a horizontal section on the line 11—11 of Fig. 10;

Fig. 12 is a vertical section on the line 12—12 of Fig. 10; and

Fig. 13 is a horizontal section on the centrally offset line 13—13 of Fig. 1, with the lower cover plate of the drum removed.

Figure 1:
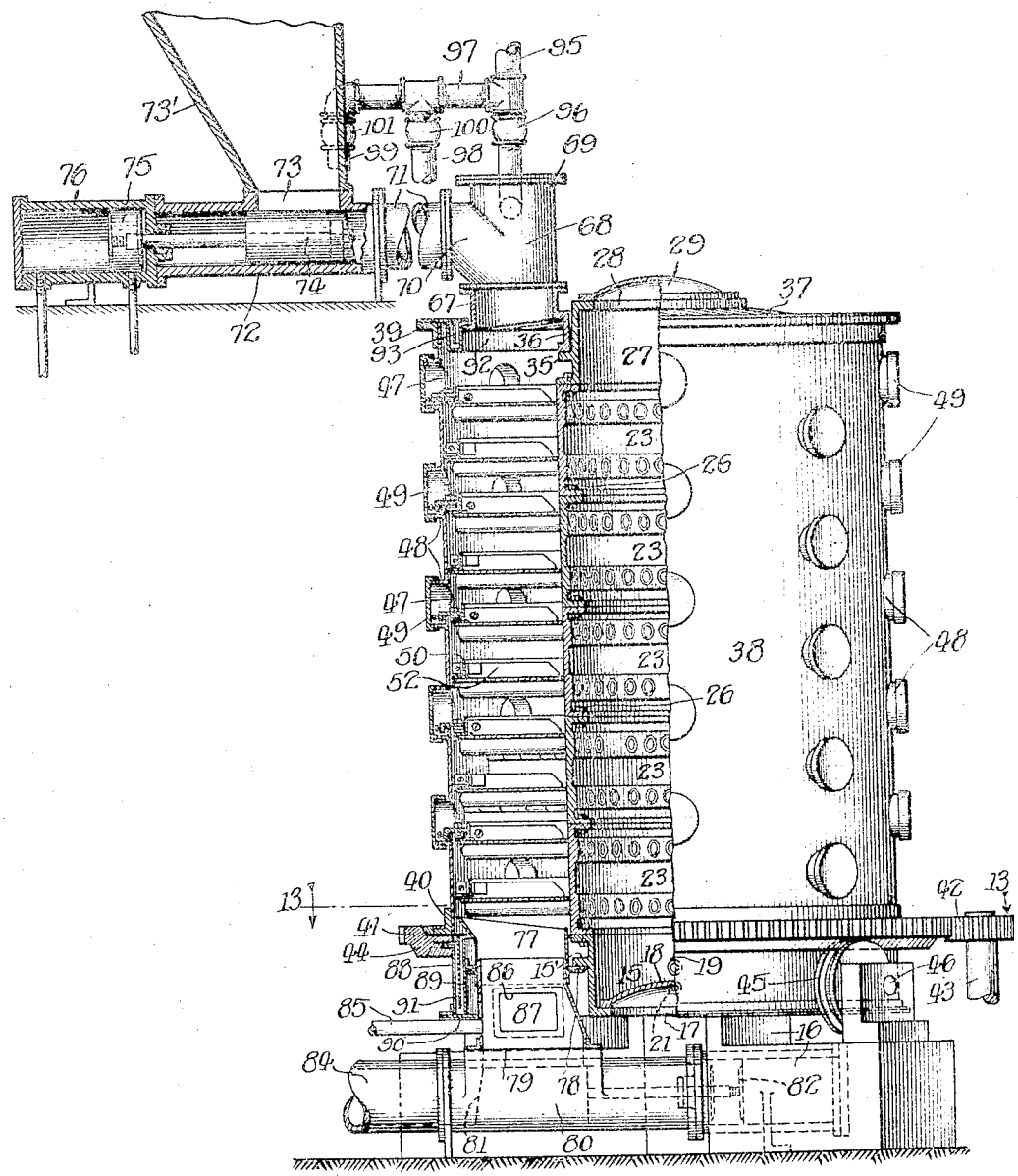
Fig. 1 is a view partly in elevation and partly in vertical section of my improved apparatus.

Referring to the drawings, 15 designates a hollow casting supported on four radial piers 16 and forming the lower or base member of a central sectional stationary steam chamber or drum. In the lower end of the casting 15 is a large opening 17 normally closed by an internal cap or cover plate 18. In the side of the member 15 is an opening 19 through which high pressure or superheated steam is supplied through a supply pipe 20, and near the bottom of the same is another opening 21 through which water of condensation is discharged through a pipe 22. Superposed on the base member 15 is a series of annular sections 23, one of which is shown in isolated detail in Figs. 6 and 7, each provided with internal top and bottom flanges 24 and 25 by which they are rigidly united by bolts 26. Superposed on the topmost section 23 is a hollow casting 27 having a large opening 28 in its upper end normally closed by a cap or cover plate 29.

The parts thus far described constitute a hollow heating drum of sufficient diameter to permit a workman to enter the same through the upper opening 28.

Figs. 6 and 7 show in detail the structure of one of the drum sections 23, from which it will be observed that the central annular member is provided with two (upper and lower) groups of hollow radially disposed tubes 30 that are closed at their outer ends and at their inner ends communicate freely with the interior of the annular section 23. It will further be observed that at one point in each series a tube is omitted leaving a space designated by 31 in Fig. 6; and it will also be observed by reference to Fig. 7 that the space 31 in the lower series of tubes is laterally offset by the width of a pair of tubes from the corresponding space of the upper series; the purpose of which will be hereinafter disclosed.

Resting upon each horizontal group of heating tubes 30 and encircling and snugly fitting the central section 23 is the annular heating plate shown in detail in Figs. 3 and 4 and designated as an entirety by 32. This is a thin metal plate conveniently made in a plurality of sectors 32′ having depending flanges 32ᵃ at their ends bolted together. By reference to Fig. 3 it will be observed that the continuity of the plate 32 is interrupted at one point to form a narrow sector-shaped opening 33 therein, the edges of which are, however, joined by a narrow oblique bridge 34, the upper surface of which is flush with the top surface of the plate, and the purpose of which will presently appear. The opening 33 of the plate registers with the space 31 in the underlying tubes. The depending radial flanges 32ᵃ of the plate are so spaced that each will lie alongside one of the heater tubes or arms 30, whereby the latter act as stops to prevent any turning movement of the plate under the drag of the material advanced by the scraper arms thereover as hereinafter described.

On the outer surface of the top member 27 of the central steam drum is a horizontal flange 35 on which is supported the hub 36 of a circular cover plate 37 that constitutes the top closure of the annular distilling chamber surrounding the central steam drum.

Surrounding and enclosing the parts thus far described is a cylindrical shell 38 conveniently made of thin metal and strengthened by top and bottom angle rings 39 and 40. Attached to the lower side of the lower angle ring 40 is a ring gear 41 engaged by a pinion 42 on a shaft 43 for driving the same and thus rotating the shell 38. On the lower side of the gear 41 is formed a V-shaped annular track 44 that travels on grooved rollers 45 mounted on horizontal stub shafts 46 supported by the supporting piers 16 of the steam drum.

At points in the shell 38 corresponding to the levels of the several heating plates are formed radial openings or hand holes 47; four such openings being shown, ninety degrees apart, at the level of each heating plate, and each opening being surrounded by a short circular flange 48 equipped with a removable cap or cover 49.

Describing now the circular scrapers, of which one is provided for each of the heating plates, 50 designates an angle ring of an outside diameter slightly less than the internal diameter of the shell 38. As shown in Fig. 12, the horizontal limb of the angle ring 50 overlies the outer peripheral portion of the heating plate 32. As shown in Fig. 11 the vertical limb of the ring 50 is vertically slotted at uniform intervals, as shown at 51, to accommodate the outer end portion of the radial scraper blades 52; the lower edge of each of the latter being cut away, as shown at 53 in Fig. 9, so that the lower edge of the blade lying within the ring 50 may be substantially flush with the lower surface of the ring, the inner end of the cut away portion being beveled, as shown at 54, to provide ample clearance from the ring to permit the blades to always follow the surface of the heating plate. On opposite sides of the vertical limb of the ring 50 adjacent to each of the slots 51 are bolted a pair of angle brackets 55, to one of which the blade is pivotally connected by a capscrew 56 in the bracket engaged with a slot 57 in the blade; the latter being loosely clamped by the screw to permit a limited vertical rocking of the blade. The inner end of the blade is beveled, as shown at 52' to prevent any jamming of the material between the blade and the steam drum.

The detail views Figs. 10, 11 and 12 illustrate the manner and means of supporting the scraper ring 50 on and from the revolving shell 38. At intervals ninety degrees apart on the horizontal limb of the ring 50, and between a pair of adjacent blades, is welded a block 58 formed with a pair of tapped holes 59 registering with tapped holes 60 in the ring 50. The opening 47 in the wall of the shell 38 has a horizontal lower edge 61 on which rests a plate 62 that projects inwardly above the block 58 and is separated from the latter by a group of spacing washers 63. This plate 62 is apertured in line with the apertures 59 and through the same are passed a pair of cap screws 64 threading into the holes 59 and 60. On the outer edge of the plate 62, outwardly of the opening 47, is a depending flange 65 carrying a pair of adjusting screws 66 which bear against the wall underlying the lower edge 61 of the opening 47; the assembly last described thus serving to both center and support the ring on and from the wall of the shell and out of frictional contact with the heating plate, with capacity of the blades to sweep over and follow the surface of the heating plate.

By reference to Fig. 12, it will be seen that the angle rings 50 also serve to seal the openings between the edges of the heating plates and the revolving shell, so that circulating vapors will not rise between the plate edges and the revolving shell, this sealing resulting from the fact that the annular spaces between the shell and the vertical flange of the ring 50 become filled with the material being treated, and since the ring and shell revolve together, this packing material does not produce friction or have any tendency to jam between relatively sliding surfaces.

An important advantage of the above-described construction lies in the fact that by disconnecting the overhead tube connections, described below, and removing the plates 62 through the hand holes, the shell can be stripped endwise from the enclosed plates, scrapers and drum for inspection, cleaning and repairs when required.

Describing next the means for feeding the material to be treated into the upper end of the annular distilling chamber, 67 designates a neck formed on the cover plate 37, on which is mounted a tubular section 68 closed at its upper end by a cap plate 69 and having a short lateral branch 70 to which is connected a short length of feed tube 71. To the outer end of the feed tube 71 is connected another feed tube section 72 having on its upper side an opening 73 surmounted by a hopper 73' through which the material may be delivered from the discharge end of a conveyor (not shown) or otherwise. Within the tube 72 is a plunger 74 connected to and reciprocated by a piston 75 in a steam or other cylinder 76 connected to the outer end of the tube 72. As the material is fed through the hopper 73' and opening 73 into the tube 74 it is, at each forward movement of the plunger, compressed and advanced to the tubular section 71, dropping thence through the upright section 68 and neck 67 onto the topmost heating plate.

From the lowermost heating plate the material is discharged into a hopper 77 mounted in and extending through an annular plate 78 that is attached to a horizontal flange 15' on the outer cylindrical wall of the base member 15 of the steam drum or core, said hopper resting upon the upper edge of a discharge opening 79 formed in the upper side of a discharge tube section 80; this latter being equipped with a plunger 81 actuated by a piston 82 in a steam or other cylinder 83 connected to one end of the tubular section 80. To the opposite end of the latter is connected another tubular discharge section 84 through which the material is advanced by successive strokes of the plunger 81 to any desired point of delivery, in some cases to a conveyor (not shown) which carries the material to the place where it is to be burned or further treated for the extraction of resin or other valuable substances contained therein.

Steam is admitted to the bottom of the annular distilling chamber by any suitable means, such as the pipe 85 herein shown as extending through one side of the discharge hopper 77, which latter may be provided with a hand hole 86 equipped with a cover plate 87 for access thereto in case of any clogging of the material.

The annular distilling chamber is effectively sealed at the bottom by means of an annular well formed between a pair of stationary outer and inner concentric rings 88 and 89 joined at their lower ends by a horizontal annular plate 90, and a rotating ring 91 attached to and depending from the lower end of the cylindrical shell and extending nearly to the bottom of the well; the latter being partly filled with any suitable sealing liquid. The annular well or trough is supported from the piers 16 and to its inner wall may be attached the outer periphery of the annular plate 78. A similar seal is employed at the upper end of the annular distilling chamber; the same comprising an annular trough or well 92 attached to the periphery of the top cover plate 37, and a depending ring 93 attached to the upper end of the revolving shell and extending nearly to the bottom of the trough or well 92, this latter being partly filled with a suitable sealing liquid. It will be observed that the rings 91 and 93 are formed on their upper edges with horizontal flanges which cover the wells and constitute dust covers for seals to prevent the material being handled from accumulating in the seal wells.

In order to effect a thorough, intimate and uniform contact of the steam admitted through pipe 85 (which expands to approximately atmospheric pressure in the distilling chamber) with the material treated, I provide means whereby this steam for the most part is caused to follow the entire path of travel of the material and preferably in the reverse direction. I have already stated that the successive heating plates from top to bottom are provided with openings to drop the material from one plate onto the next, which openings are laterally offset or staggered relatively to each other around the axis of the distilling chamber in a direction reverse to the direction of travel of the scrapers. Normally the steam in flowing upwardly would seek a direct path from the opening of each plate to the relatively offset opening of the next higher plate, and would not flow around and through each individual compartment between adjacent plates. I have, however, provided means whereby the bulk of the steam is caused to travel around and through each individual compartment before passing upwardly into the next higher compartment; and this means, as best shown in Fig. 7, comprises a pair of swinging baffle plates 94 that are suspended from a pair of adjacent heating tubes 30 lying next to the discharge opening 33 of the heating pla' and the registering opening 31 of the tubular heating device; these baffle plates extending down to approximately the top surface of the next underlying heating plate. These baffles practically close the short passageway from a lower opening to the next higher opening, and cause the steam to take the long passage around the drum section 23 before it can pass upwardly through the higher opening. As the scraper arms, after passing over the openings 33 through which the material is dropped strike the lower ends of the baffles 94, the latter are swung upwardly just sufficiently to permit the blades to pass therebeneath; but when the baffles are opened to that extent the gap between their lower edges and the heating plate is practically closed by the blades themselves, so that little or no steam finds its way upwardly by the short path. Manifestly a single baffle plate would be fairly efficient to serve this function, but I prefer to employ a pair of such baffle plates opening successively as affording a more perfect seal for confining the flow of the steam to the long circuitous path. It is also evident that the direction of flow of this steam may be reversed, so as to be parallel instead of counter-current.

To carry off the vapor distilled I provide a discharge pipe 95 that is connected into the upper portion of the tubular feed section 68 and is equipped with a controlling valve 96. For the purposes of more or less preheating the material and condensing out some of the water vapor, I preferably provide means for directing the flow of the distillate more or less through the inflowing material before it passes into the discharge line 95; the same comprising a laterally extending pipe 97 communicating with the pipe 95 and equipped with spaced branches 98 and 99 connecting into the feed section 71 and equipped with controlling valves 100 and 101 respectively. Manifestly, by closing the valve 96 and opening either of the valves 100 and 101, the flow of the distillate may be directed more or less through the incoming material giving up a part of its heat and water vapor to the latter. The advantage of this is not only or mainly that it preheats the material, but it condenses out the surplus steam in the mixture, reducing the latter to a turpentine saturated condition, and thus increasing the ratio of turpentine to water vapor in the mixture that goes to the condenser.

It is believed that the structural features and mode of operation of my improved apparatus will be clear from the foregoing description without further elaboration; but I desire to briefly point out some of the more important novel features of treatment and the advantageous results flowing therefrom. The indirect heating of the material by the latent heat of high pressure or superheated steam transmitted through the heating plates has the function and effect of vaporizing and driving off the turpentine contained in the material without saturating the material with moisture which is, of course, a detriment to its subsequent fuel value. The radial heating tubes are employed mainly to increase the heating surface over what would be obtained by using a simple steam drum without such tubes. On the other hand, by subjecting the material treated to direct contact with low pressure steam in a quantity more than sufficient to carry off the turpentine, the resulting vapor can never become saturated with turpentine vapor (which would retard or entirely stop the further vaporization of the turpentine). The surplus steam in the mixture thus has the beneficial effect of increasing the rate of evaporation of the turpentine from the material, and is also available for preheating the material, by which the ratio of the turpentine to the water vapor in the mixture that goes to the condenser for final separation is increased. This beneficial effect of the low pressure steam in direct contact with the material is manifestly enhanced by causing the steam to flow countercurrent to the travel of the solid material throughout the entire path of the latter, and simultaneously maintaining the solid material in a constant state of agitation and tumbling, whereby practically every particle of the latter is subjected to the action of the steam.

In situations where excessive wetting of the material is not objectionable, as where it is not subsequently used for fuel, the indirect heating herein shown and described may be omitted, and steam admitted into direct and intimate contact with the material in sufficient volume to both volatilize the oil and maintain a circulation of the vapor in a non-saturated condition.

It is manifest that the physical embodiment of the invention herein described and illustrated may be widely varied in details without departing from the principles involved or sacrificing any of the advantages secured. Hence I reserve all such variations and modifications as fall within the spirit and purview of the appended claims.

I claim—

1. In a retort for distilling oil from solid substances, the combination of a series of spaced superposed stationary plates, a rotatable shell surrounding said plates, scrapers resting on said plates and connected to and adapted to be driven by said shell, means for admitting the material to be treated onto the top plate of the series, means for passing the material from each plate to the next underlying plate, means for heating the material, and means for discharging the material from the lower end of the retort.

2. In a retort for distilling oil from solid substances, the combination of a series of spaced superposed stationary plates, a rotatable shell surrounding said plates, scrapers resting on said plates and connected to and adapted to be driven by said shell, means for admitting the material to be treated onto the top plate of the series, means for passing the material from each plate to the next underlying plate, means for admitting a heating medium to the spaces between adjacent plates, and means for discharging the material from the lower end of the retort.

3. In a retort for distilling oil from solid substances, the combination of a central upright column, a series of vertically spaced annular plates encircling and supported from said column, a rotatable shell enclosing said column and plates, scraper blades resting on said plates and connected to and adapted to be driven by said shell, means for admitting the material to be treated onto the top plate of the series, means for delivering the material from each plate to the next underlying plate, means for circulating a heating medium successively through the annular spaces between adjacent plates, and means for discharging the material from the lower end of the retort.

4. In a retort for distilling oil from solid substances, the combination of a series of spaced superposed stationary plates, a rotatable shell surrounding said plates, scrapers resting on said plates and connected to and adapted to be driven by said shell, stationary top and bottom cover plates for said shell, means for feeding material to be treated through said top cover plate onto the topmost stationary plate, means for delivering the material from each plate to the next underlying plate, means for admitting a fluid heating medium into said shell, means for sealing the ends of said shell against escape of said heating medium, and means for discharging the material through said bottom cover plate.

5. In a retort for distilling oil from solid substances, the combination of a central upright column, a series of vertically spaced annular plates encircling and supported from said column, a rotatable shell enclosing said column and plates, top and bottom cover plates for said shell mounted on the upper and lower ends of said column, scrapers resting on said annular plates and connected to and adapted to be driven by said shell, means for feeding material to be treated through said top cover plate onto the topmost annular plate, means for delivering the material from each plate to the next underlying plate, means for admitting a fluid heating medium into said shell, means for sealing the ends of said shell and said top and bottom cover plates, and means for discharging the material through said bottom cover plate.

6. In a retort for distilling oil from solid substances, the combination of a stationary upright steam drum, a series of stationary spaced superposed annular plates encircling said drum, means for supplying steam to said drum, means for heating said plates by said steam, a rotatable shell surrounding said plates, scrapers resting on said plates and connected to and adapted to be driven by said shell, means for admitting the material to be treated onto the top plate of the series, means for passing the material from each plate to the next underlying plate, and means for discharging the material from the lower end of the retort.

7. In a retort for distilling oil from solid substances, the combination of a stationary upright steam drum, a series of spaced groups of radial tubes closed at their outer ends and at their inner ends connected into and communicating with said drum, annular plates encircling said drum and resting on said tubes, means for supplying steam to said drum, a rotatable shell encircling said plates, scrapers resting on said plates and connected to and adapted to be driven by said shell, means for admitting the material to be treated onto the top plate, means for delivering the material from said plate to the next underlying plate, and means for discharging the material from the lower end of the retort.

8. In an apparatus of the character described, the combination of a series of vertically spaced stationary circular plates formed with openings that are relatively offset laterally around the centers of said plates, a rotatable shell encircling said plates, scraper blades resting on said plates and connected to and adapted to be driven by said shell, means for admitting a heating fluid to one end of said shell, and means for causing said fluid to flow through each compartment between adjacent plates around the axis thereof before flowing into an adjacent compartment.

9. In an apparatus of the character described, the combination of a series of vertically spaced stationary circular plates formed with sector-shaped openings that are relatively offset laterally around the centers of said plates, a rotatable shell encircling said plates, radially disposed scraper blades resting on said plates and connected to and adapted to be driven by said shell, means for admitting a heating fluid to one end of said shell, and swinging baffle plates suspended from corresponding edges of said openings and each extending downwardly substantially to the top of the next underlying plate; said baffle plates serving to compel said heating fluid to follow a circuitous path around the axis of each compartment between adjacent circular plates before flowing into an adjacent compartment.

10. In an apparatus if the character described, the combination of a stationary plate, a rotatable shell encircling said plate, a scraper ring mounted on and within said shell, and a series of scraper arms resting on said plate and at their outer ends hinged to said scraper ring.

11. In an apparatus of the character described, the combination of a stationary circular plate, a rotatable shell encircling said plate, a scraper ring mounted on and within said shell adjacent to the periphery of said plate, and a series of radially disposed scraper arms resting on said plate and at their outer ends hinged to said scraper ring.

12. In an apparatus of the character described, the combination of a stationary circular plate, a rotatable shell encircling said plate and provided with a series of hand holes spaced around its circumference, a scraper ring within said shell, means for adjustably supporting said ring on the bottom edges of said hand holes, a series of radially disposed scraper arms resting on said plate and at their outer ends hinged to said scraper ring, and covers for said hand holes.

13. In an apparatus of the character described, the combination of a central upright core member, a series of vertically spaced annular plates encircling and supported on said core member, a rotatable shell encircling said plates, scraper rings within said shell adjacent to the peripheries of said plates, scraper blades lying on said plates and at their outer ends connected to said rings, and means for detachably connecting said rings to said shell permitting the latter to be bodily withdrawn endwise from said core and plates.

14. In an apparatus of the character described, the combination of a central upright core member, a series of vertically spaced annular plates encircling and supported on said core member, a shell encircling said plates, scraper rings within said shell adjacent to the peripheries of said plates, radially disposed scraper blades resting on said plates and at their outer ends pivoted to said rings, means for detachably connecting said rings to said shell permitting the latter to be bodily withdrawn endwise from said core and plates, a circular trackway on which the lower end of said shell is rotatably mounted, and means for turning said shell on said trackway.

15. In a distilling retort of the character described, the combination of a stationary steam drum, a series of spaced annular plates surrounding said drum, a single shell enclosing said drum and plates, scrapers on said plates adapted to be driven by said shell, gearing for rotating said shell, and means for feeding solid material to, and discharging it from, said shell.

16. In a retort for distilling oil from solid substances, the combination of a stationary upright steam drum, a series of spaced groups of radial tubes connected at their inner ends into and communicating with said drum, annular plates encircling said drum and resting on said tubes, a rotatable shell encircling said plates, scrapers on said plates adapted to be driven by said shell, means for supplying steam to said drum, and means for passing the material to be treated successively over said plates.

17. In a distilling retort of the character described, the combination of a stationary upright steam drum, a series of spaced annular plates surrounding said drum, a rotatable shell encircling said drum and plates, scrapers on said plates adapted to be driven by said shell, stationary top and bottom cover plates for said shell carried by said drum, means for creating liquid seals between the ends of said shell and said top and bottom cover plates, and dust covers for said sealing means.

18. In a retort for distilling oil from solid substances, the combination of a stationary steam drum, a series of spaced annular heating plates surrounding said drum, a rotatable shell enclosing said drum and plates, scrapers on said plates adapted to be driven by said shell, means for effecting the travel of the material heated over said plates, means for feeding the material to, and discharging it from, said shell, and driving mechanism for said shell, and said feeding and discharging means located entirely outside said retort.

McGARVEY CLINE.